United States Patent
Haberland et al.

(10) Patent No.: US 11,703,481 B2
(45) Date of Patent: Jul. 18, 2023

(54) METHOD FOR CHECKING A COMPONENT TO BE PRODUCED IN AN ADDITIVE MANNER, AND DEVICE

(71) Applicant: Siemens Energy Global GmbH & Co. KG, Munich (DE)

(72) Inventors: Christoph Haberland, Bochum (DE); Matthias Jungbluth, Berlin (DE); Andreas Kreutzer, Berlin-Hellersdorf (DE); Heiko Lammers, Berlin (DE); Thomas Lorenz, Berlin (DE); Martin Regener, Berlin (DE); Kathrin Sperlich, Berlin (DE); Danny Tomuschat, Potsdam (DE)

(73) Assignee: SIEMENS ENERGY GLOBAL GMBH & CO., Munich (DE)

( * ) Notice: Subject to any disclaimer, the term of this patent is extended or adjusted under 35 U.S.C. 154(b) by 67 days.

(21) Appl. No.: 16/068,940

(22) PCT Filed: Dec. 5, 2016

(86) PCT No.: PCT/EP2016/079730
§ 371 (c)(1),
(2) Date: Jul. 10, 2018

(87) PCT Pub. No.: WO2017/129294
PCT Pub. Date: Aug. 3, 2017

(65) Prior Publication Data
US 2019/0015901 A1    Jan. 17, 2019

(30) Foreign Application Priority Data
Jan. 28, 2016    (DE) .................. 10 2016 201 291.6

(51) Int. Cl.
*G01N 29/12*    (2006.01)
*G01N 29/44*    (2006.01)
(Continued)

(52) U.S. Cl.
CPC ............. *G01N 29/12* (2013.01); *B22F 10/28* (2021.01); *B22F 10/38* (2021.01); *B22F 12/90* (2021.01);
(Continued)

(58) Field of Classification Search
CPC .................................. B22F 10/20; B22F 10/38
See application file for complete search history.

(56) References Cited

U.S. PATENT DOCUMENTS

| | | | |
|---|---|---|---|
| 2007/0176312 A1* | 8/2007 | Clark | ................ B23K 15/0086 264/40.1 |
| 2007/0259066 A1 | 11/2007 | Sperry et al. | |

(Continued)

FOREIGN PATENT DOCUMENTS

| | | |
|---|---|---|
| CN | 101067720 A | 11/2007 |
| CN | 103978684 A | 8/2014 |

(Continued)

OTHER PUBLICATIONS

Espacenet machine translation of DE-102011008774-A1 retrieved on Mar. 14, 2020 (Year: 2012).*

(Continued)

*Primary Examiner* — Jophy S. Koshy
*Assistant Examiner* — Joshua S Carpenter

(57) ABSTRACT

A method for checking a component to be produced in an additive manner, having the steps of mechanically exciting at least one additively constructed layer of the component during the additive production of the component, measuring a mechanical response signal of the component, and displaying a warning and/or interrupting the additive production of the component if the mechanical response signal lies outside of a specified tolerance range. A device for the additive production of a component, includes a device for mechanically exciting the at least one additively constructed (Continued)

layer of the component, a measuring unit for measuring the mechanical response signal of the component, and a control unit. The control unit is designed to display the warning and/or interrupt the additive production if the mechanical response signal lies outside of a specified tolerance range.

9 Claims, 2 Drawing Sheets

(51) Int. Cl.
| | |
|---|---|
| *B33Y 10/00* | (2015.01) |
| *B33Y 50/02* | (2015.01) |
| *G01N 29/22* | (2006.01) |
| *B22F 10/38* | (2021.01) |
| *B22F 10/28* | (2021.01) |
| *B22F 12/90* | (2021.01) |
| *B33Y 30/00* | (2015.01) |
| *B29C 64/153* | (2017.01) |
| *B29C 64/20* | (2017.01) |
| *B22F 10/322* | (2021.01) |
| *B22F 10/36* | (2021.01) |
| *B23K 26/342* | (2014.01) |
| *B23K 31/12* | (2006.01) |

(52) U.S. Cl.
CPC ............... *B33Y 10/00* (2014.12); *B33Y 30/00* (2014.12); *B33Y 50/02* (2014.12); *G01N 29/22* (2013.01); *G01N 29/4427* (2013.01); *B22F 10/322* (2021.01); *B22F 10/36* (2021.01); *B22F 2999/00* (2013.01); *B23K 26/342* (2015.10); *B23K 31/125* (2013.01); *B29C 64/153* (2017.08); *B29C 64/20* (2017.08); *G01N 2291/0234* (2013.01); *G01N 2291/0289* (2013.01); *Y02P 10/25* (2015.11)

(56) References Cited

U.S. PATENT DOCUMENTS

| | | | |
|---|---|---|---|
| 2011/0121492 A1 | 5/2011 | Philippi et al. | |
| 2014/0159266 A1* | 6/2014 | Bamberg | B23K 31/125 |
| | | | 264/40.1 |
| 2015/0060403 A1* | 3/2015 | Carter | C22C 1/0491 |
| | | | 216/53 |
| 2015/0321421 A1* | 11/2015 | Ding | B29C 64/129 |
| | | | 264/401 |
| 2016/0146886 A1 | 5/2016 | Finkenzeller et al. | |
| 2016/0325541 A1 | 11/2016 | Lavrentyev et al. | |
| 2016/0332371 A1 | 11/2016 | Staroselsky et al. | |
| 2017/0028703 A1* | 2/2017 | Xu | F01D 5/005 |
| 2017/0066084 A1* | 3/2017 | Ladewig | B33Y 40/00 |

FOREIGN PATENT DOCUMENTS

| | | | | |
|---|---|---|---|---|
| CN | 105026942 A | 11/2015 | | |
| CN | 106001563 A | 10/2016 | | |
| CN | 106018288 A | 10/2016 | | |
| DE | 102011008774 A1 * | 7/2012 | ............ | G01N 29/07 |
| DE | 102011008774 A1 | 7/2012 | | |
| EP | 1815936 A1 | 8/2007 | | |
| JP | 2011121364 A | 6/2011 | | |
| WO | 2012097799 A2 | 7/2012 | | |
| WO | 2012097799 A3 | 10/2012 | | |
| WO | 2015109096 A1 | 7/2015 | | |
| WO | 2015112422 A1 | 7/2015 | | |
| WO | 2015157381 A1 | 10/2015 | | |

OTHER PUBLICATIONS

Merriam-Webster's online dictionary definition of resonance curve <https://www.merriam-webster.com/dictionary/resonance%20curve#:~:text=%3A%20a%20curve%20whose%20abscissas%20are,of%20the%20near%2Dresonant%20vibrations> (Year: 2021).*
International Search Report dated Mar. 15, 2017, for PCT/EP2016/079730.

* cited by examiner

METHOD FOR CHECKING A COMPONENT TO BE PRODUCED IN AN ADDITIVE MANNER, AND DEVICE

CROSS REFERENCE TO RELATED APPLICATIONS

This application is the US National Stage of International Application No. PCT/EP2016/079730 filed Dec. 5, 2016, and claims the benefit thereof. The International Application claims the benefit of German Application No. DE 102016201291.6 filed Jan. 28, 2016. All of the applications are incorporated by reference herein in their entirety.

FIELD OF INVENTION

The present application relates to a method for testing a component produced or to be produced additively or in a layer-by-layer manner and a device for the additive production of the component.

The component can be a turbine component, for example, a part of a gas turbine to which hot gas is applied or which is subjected to high temperatures, and/or a workpiece or a component made of a nickel-based or cobalt-based super alloy.

BACKGROUND OF INVENTION

Known additive or generative production methods are in particular selective laser melting (SLM), selective laser sintering (SLS), and electron beam melting (EBM). In the known methods, the component is frequently exposed, fused, and constructed accordingly layer-by-layer in a powder bed by fusing particles forming the powder bed using a laser beam or electron beam.

An additive production system is described, for example, in WO 2015/112422 A1.

Heretofore, for example, it has not been possible to achieve the material quality of components produced by casting methods, in particular in the production of turbine blades by additive methods. In particular, the structure of additively produced components is unfavorable with respect to tensions, grain sizes, and/or structural defects in relation to structures which are produced or producible by casting or methods for directional solidification. Directionally-solidified microstructures advantageously refer in the present case to both monocrystals, which do not have grain boundaries or at most have small angle grain boundaries, and also columnar crystal structures, which do have grain boundaries extending in the longitudinal direction, but do not have transverse grain boundaries.

Heretofore, for example, flaws occurring during an SLM method, for example, structural flaws, have only been able to be detected after completion of the method by testing methods of the prior art. A readjustment of the production parameters or the discarding of the component even during the production, for example, because of structural defects and/or detachments of the component from a component substrate, has heretofore not been possible. In particular, such a detachment or a delamination of the component from the component substrate can result in a collision of the component with a coater unit and thus severe damage to the facility or device. Structural flaws induced by thermal tensions, such as cracks or warping of the component, for example, also cannot be detected during the production. Terminating the production process heretofore only takes place in additive production methods of the prior art if, for example, another significant disturbance is established which does not relate to the structure of the component.

It would be possible, for example, solely to remove the component from the device after each applied and/or constructed layer and to test it for material defects and subsequently reinstall it, wherein this method would, however, be much too inefficient with respect to time and thus would not be applicable.

SUMMARY OF INVENTION

It is therefore an object of the present invention to specify means, using which material testing of a component produced or to be produced additively is enabled even during the production.

This object is achieved by the subject matter of the independent claims. Advantageous embodiments are the subject matter of the dependent patent claims.

One aspect of the present invention relates to a method for testing a component produced or to be produced additively or in a layer-by-layer manner. The method can be a testing method of the quality, in particular the material quality, of the component.

The method can be in particular an in-situ method for material testing.

Furthermore, the quality refers in particular to the material quality of the component with respect to structural defects and/or a detachment, for example, from a component substrate.

The method comprises the mechanical excitation of at least one additively constructed layer of the component during a production of the component.

The expression "during" the additive production advantageously describes a point in time after or during a solidification or exposure of a single layer of the or for the component(s) and a point in time at which the component is advantageously not yet finished.

In one embodiment, the method comprises the mechanical excitation of a single additively constructed or solidified layer of the component.

In one embodiment, the method comprises the mechanical excitation of a plurality of additively constructed layers of the component.

The method furthermore comprises the measurement of a mechanical response signal of the component, in particular constructed up to this point in time. The response signal advantageously comprises an item of information about the mechanical behavior of the component, in particular an item of information about the mechanical response behavior to the mechanical excitation or the excitation, respectively.

The method furthermore comprises the display of a warning and/or the carrying out of a termination of the additive production of the component if the mechanical response signal or one or more measured values of the response signal lies/lie outside a predetermined tolerance range, wherein the mechanical response signal is compared to a simulated or computed value for the display of the warning and/or the carrying out of the termination. The value can be based, for example, on a simulation, for example, a finite element analysis. The simulated or computed value can define the predetermined tolerance range.

The predetermined tolerance range advantageously refers to a value range for which and insofar as the mechanical response signal lies within this predetermined tolerance range, the component was produced or constructed with a sufficient material quality or freedom from flaws.

In one embodiment, the method comprises the display of a warning or the carrying out of a termination of the additive production of the component if the mechanical response signal or one or more measured values of the response signal lie outside the predetermined tolerance range.

In one embodiment, the method comprises the display of a warning if the mechanical response signal or one or more measured values of the response signal lie outside the predetermined tolerance range. According to this embodiment, the predetermined tolerance range is advantageously a first predetermined tolerance range.

In one embodiment, the method comprises the carrying out of a termination of the additive production of the component if the mechanical response signal or one or more measured values of the response signal lie outside the predetermined tolerance range. According to this embodiment, the predetermined tolerance range is advantageously a second predetermined tolerance range.

In one embodiment, the warning is displayed if the mechanical response signal lies outside the first predetermined tolerance range.

In one embodiment, the termination of the additive production of the component is carried out if the mechanical response signal lies outside the second predetermined tolerance range.

In one embodiment, the second predetermined tolerance range is greater than the first predetermined tolerance range.

By way of these embodiments, a higher tolerance can advantageously be defined for a termination of the production method, wherein it can be left to the discretion of a user of the method by the warning whether the method, for example, is to be completely terminated even in the event of a (substantial) structural flaw of the component.

When the predetermined tolerance range is mentioned hereafter, this can mean in particular the first predetermined tolerance range or the second predetermined tolerance range.

According to the above-mentioned embodiments, the measurement of the mechanical response signal can be carried out after each individual one or after a plurality of presently constructed layers of the component.

In one embodiment, the component to be additively produced is excited together with a component substrate, on which the component is produced or constructed. Accordingly, the response signal advantageously comprises an item of information about the mechanical behavior or the mechanical properties of both the component produced up to that point or partially produced and also of the component substrate.

The designation of the expression "component" can mean in the present case in particular the component to be produced and also the partially or completely produced component and optionally also the component substrate.

A further aspect of the present invention relates to a device for the additive production of a component, comprising a unit for mechanically exciting at least one additively constructed layer of the component and/or together with a component substrate. The device furthermore comprises a measuring unit for measuring a mechanical response signal of the component and/or together with the component substrate. The device can comprise the component substrate. The device furthermore comprises a monitoring unit, wherein the monitoring unit is designed to display a warning and/or carry out a termination of the additive production if the mechanical response signal lies outside the predetermined tolerance range.

In one embodiment, the measuring unit comprises a sound, vibration, and/or acceleration pickup, a laser vibrometer, and/or a piezoelectric sensor. According to this embodiment, the component can be mechanically excited particularly suitably for the material testing.

The present invention in particular advantageously specifies an "early warning system", whereby in particular the production device can be protected from damage. Furthermore, by way of the display of the warning and/or the carrying out of the termination (process termination), the additive production method can be made more efficient, since production or machine runtime no longer has to be "wasted" for the additive construction of an already damaged or structurally unusable component. In other words, in this manner unnecessary machine runtimes can be precluded or prevented.

In one embodiment, the mechanical excitation is carried out by means of sound, vibrations, and/or oscillations, for example, piezoelectrically.

In one embodiment, the mechanical excitation and/or the measurement of the mechanical response signal are part of an acoustic resonance or oscillation analysis, a sound emission analysis, an ultrasound test, and/or a vibration test. In this manner, the material testing of the component can take place particularly suitably.

According to the above-described embodiments, the unit for mechanical excitation of the device is advantageously designed in accordance with the described testing method or analysis methods. The described method is advantageously a method known to a person skilled in the art for nondestructive material testing.

In one embodiment, a characteristic frequency spectrum of the component and/or the component platform is used for the mechanical excitation and/or the measurement of the mechanical response signal. The described frequency spectrum advantageously describes a characteristic spectrum of component substrate and component at least partially constructed thereon. The characteristic frequency spectrum can be, for example, a resonance curve of the component.

In one embodiment, the method is carried out and/or the device is designed in such a way that a structural flaw or defect in the layer and/or a detachment of the component from the component substrate has the result that the mechanical response signal lies outside the predetermined tolerance range. The structural flaw can be, for example, a crack, an imperfection, a shift, and/or a formation of specific grain sizes in the structure of the component. A crack in the component merely results, for example, in a small deviation of the mechanical response signal or a measured value thereof from a setpoint value, wherein advantageously only the first above-mentioned predetermined tolerance range is "exceeded", but not the second predetermined tolerance range. In contrast, a detachment of the component from the component substrate advantageously has the result that the response signal also exceeds the second predetermined tolerance range (see above).

In one embodiment, the mechanical response signal for the display of the warning and/or the carrying out of the termination is compared to a mechanical response signal, for example, in particular one or more measured values, of at least one layer which was additively constructed previously, i.e., before the actual layer. In particular, a setpoint-actual comparison can be carried out. The described value or measured value of the previously constructed layer can define the predetermined tolerance range.

In one embodiment, it is recognized by an advantageously automatic pattern recognition whether the mechanical response signal or measured values thereof lie inside or outside the predetermined tolerance range.

A further aspect of the present invention relates to an additive production method comprising the described method for testing the quality of the component to be additively produced. The additive production method comprises the additive or layer-by-layer production of at least one further layer for the component if the mechanical response signal lies inside the predetermined tolerance range.

In one embodiment, the additive production method is or comprises selective laser melting, selective laser sintering, and/or electron beam melting. The method is advantageously a method for selective laser melting (SLM).

In one embodiment, the additive production method comprises a solidification step, wherein the mechanical excitation is (also) carried out during a solidification of individual additively constructed or produced layers of the component.

In one embodiment—proceeding from the mechanical response signal—parameters of the production of the component are adapted to avoid flaws or damage, for example, (further) material, device, or resulting damage. It is thus advantageously possible to react under certain circumstances in-situ to a production flaw in or on the component by an adaptation of the parameters and to dispense with a new production of the component.

A further aspect of the present invention relates to a component which is produced or is producible by the described method.

The described component advantageously has specific and/or characteristic properties according to the described production method. For example, the component can be differentiated with respect to its structural or surface properties by relevant methods of surface or structural analysis, which were produced or are producible by means of other methods. Such methods are, for example, transmission electron microscopy, energy-dispersive x-ray analysis, and/or x-ray fluorescence analysis.

Embodiments, features, and/or advantages which relate in the present case to the method can also relate to the device and/or the component, and vice versa.

BRIEF DESCRIPTION OF THE DRAWINGS

Further details of the invention will be described hereafter on the basis of the drawing. Identical or corresponding elements of the drawing are respectively provided with identical reference signs in the individual figures.

DETAILED DESCRIPTION OF INVENTION

Figure 1:
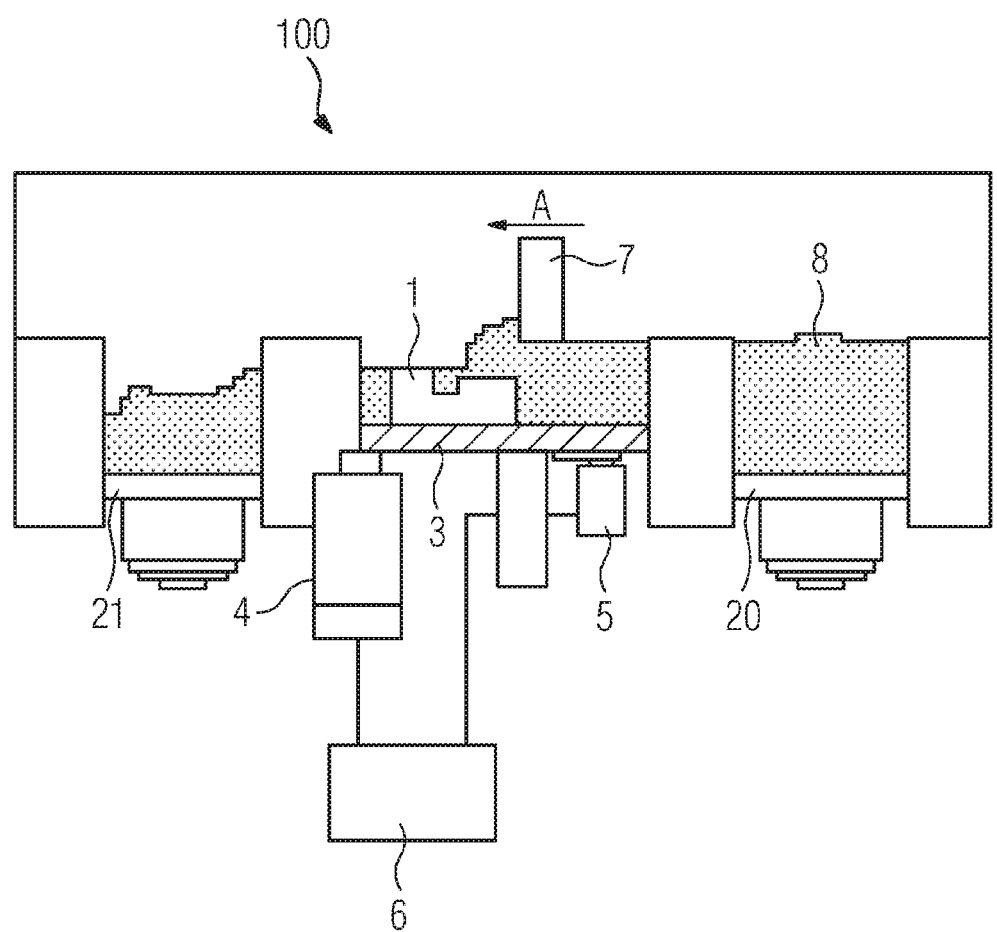
FIG. 1 schematically shows a sectional or side view of a device for additive production of a component or workpiece.

FIG. 1 shows a device 100. The device 100 is advantageously a device for additive production of a component or workpiece 1.

A method for testing, in particular material testing of the component 1 will be described on the basis of the device 100. Furthermore, an additive production method for the component 1 will be indicated and/or described.

Figure 2:
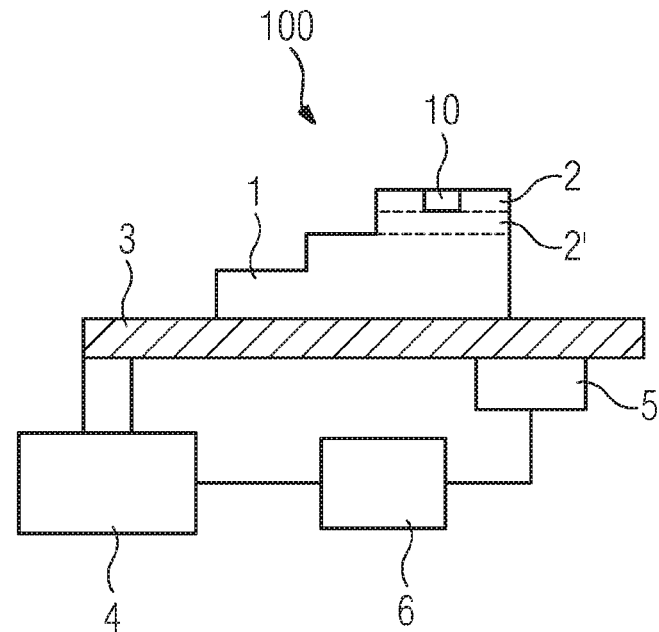
FIG. 2 schematically indicates at least a part of a method for testing the component according to a first embodiment.

The component 1 can be a three-dimensional object which is produced or producible according to a predetermined or desired geometry, and which is constructed according to the additive production method, for example, an SLM method (selective laser melting), by a plurality of individual layers (cf., for example, reference signs 2 and 2' in FIG. 2).

The component 1 can be a turbine component, for example, a part in the hot gas path of a gas turbine, for example, made of a nickel-based or cobalt-based super alloy.

In FIG. 1, the component 1 is advantageously shown only partially and not completely produced, i.e., during its additive production.

The device 100 comprises a component platform or a component substrate 3. The component substrate 3 can be lowered, for example, in relation to further components of the device 100. After the production of an individual layer of the component or for the component 1, the component substrate 3 is advantageously lowered by an amount corresponding to the layer thickness and subsequently individually fused and solidified, for example, using a laser beam. A corresponding laser device or solidification device is not explicitly shown in the figures.

During selective laser melting (SLM method), in the scope of the solidification, a powder bed is scanned and/or advantageously solidified according to a predefined solidification or exposure geometry. Corresponding data for the solidification are advantageously taken directly from a 3D CAD file.

Alternatively to the SLM method, the described additive production method can be selective laser sintering (SLS) or electron beam melting (EBM).

The device 100 furthermore comprises a powder feed or powder feed unit 20.

The device 100 furthermore comprises a powder discharge or powder discharge unit 21.

The device 100 furthermore comprises a coater unit or a squeegee blade 7. With the aid of the coater unit 7, powder 8 for the component 1 is advantageously taken from the powder feed 20 and distributed (layer-by-layer) for each individual production step in a production chamber onto the component substrate 3 (cf. distribution along direction A in FIG. 1). Excess powder 8 is pushed by the coating unit 7 into the powder discharge 21.

The powder feed 20 and/or the powder discharge 21 can in turn comprise platforms which can be lowered (not explicitly shown).

The device 100 furthermore has a unit 4 for mechanically exciting the component 1. The component 1 is advantageously excited together with the component substrate 3 during the mechanical excitation, since the component 1 or individual layers of the component 1 are advantageously integrally joined or metallurgically bonded to the component substrate 3. For this purpose, the unit 4 is advantageously arranged on a lower side of the component substrate 3 and physically connected to the component substrate 3. The unit 4 can generate, for example, sound, vibrations, or oscillations. Accordingly, the unit 4 can be or comprise a piezoelectric element. The unit 4 can furthermore be designed for mechanical excitation by means of acoustic resonance or oscillation analysis, sound emission analysis, vibration testing, and/or ultrasonic testing.

The characteristic frequency spectrum can be a resonance to be measured, for example, a resonance curve of the component 1, on the component substrate 3.

In particular, the unit 4 can be designed, advantageously in the case of a material or structural testing by means of resonance or oscillation analysis, to resonantly excite the component 1 by means of a characteristic frequency spectrum. For example, a plurality of different oscillation modes of the component 1 can be resonantly excited by the unit 4. A mechanical response signal of the component 1 on the component substrate 3 is advantageously measured as a response to this resonance or excitation.

For this purpose, the device 100 furthermore has a measuring unit 5. The measuring unit 5 is advantageously arranged on a lower side of the component substrate 3. The measuring unit 5 is designed to measure, record, or register one or more mechanical response signals of the component 1 which has been at least partially produced or constructed (up to this point). Accordingly, the measuring unit 5 can have a sound, vibration, or acceleration pickup. In particular, the measuring unit 5 can comprise a laser vibrometer or a piezoelectric sensor.

The response signals or corresponding measured values are advantageously oscillation signals of the component 1 together with the component substrate 3, which differ only slightly from layer to layer according to the progress of the production of the component 1.

The device 100 furthermore has a monitoring unit 6. The monitoring unit 6 is connected, suitably electrically connected, to the unit 4 and the measuring unit 5. The monitoring unit 6 is advantageously designed to display a warning and/or carry out a termination of the additive production if a mechanical response signal lies outside the predetermined tolerance range.

The proposed method comprises the mechanical excitation of one or a plurality of additively constructed layers or layers to be produced of the component during the additive production of the component 1.

The mechanical excitation advantageously takes place after the solidification or production of each individually produced or constructed layer for the component 1. Alternatively, the mechanical excitation can take place after the solidification or production of two or more layers for the component 1. The mechanical excitation can also take place, for example, during the solidification of the powder 8 using a laser beam.

The method furthermore comprises the measurement of the mechanical response signal. The response signal advantageously comprises items of information about the oscillation behavior, in particular about the natural or resonant frequencies of the component 1 together with the component substrate 3, on which the component 1 is produced.

Furthermore, the method comprises the display of a warning and/or the carrying out of a process termination or termination of the production of the component, if the mechanical response signal or one or more measured values thereof lie outside a predetermined tolerance range.

The predetermined tolerance range advantageously preferably refers to a value range, for example, of measured values of the oscillation behavior, of the or for the response signal, in the scope of which the component 1 is to be qualified as constructed free of flaws.

In the present case, a first predetermined tolerance range and a second predetermined tolerance range can be determined or defined in the scope of the described method, wherein the second predetermined tolerance range is advantageously greater or more broadly defined than the first predetermined tolerance range.

The first and the second predetermined tolerance ranges are advantageously selected in such a way that if a mechanical response signal solely lies outside the first predetermined tolerance range, for example, a warning is output to a user or operator. If a mechanical response signal also lies outside the second predetermined tolerance range, for example, the entire production method is advantageously terminated.

FIG. 2 shows a schematic sectional or side view of the device 100 (a coater unit, a powder feed, and also a powder discharge are not shown, in contrast to FIG. 1). FIG. 2 shows in particular a partially produced component 1 on the component substrate 3. Furthermore, a presently or last constructed, i.e., solidified layer 2 is shown. The layer 2 has been produced, constructed, or solidified on a layer 2' constructed previously, i.e., before the layer 2.

The layer 2' advantageously does not have any substantial structural defects, for example, crystal flaws, imperfections, shifts, or other flaws detectable by mechanical excitation. Accordingly, the response signal (not explicitly identified) of the layer 2' is advantageously located by the described method within the predetermined tolerance range and a warning does not have to be displayed, nor does the production process have to be terminated.

The layer 2 has a structural flaw 10 (see above) identified with the reference sign 10. The structural flaw is advantageously sufficiently large or severe that a deviation, for example, of the oscillation or vibration behavior, as described above, can advantageously be measured by means of the described method via the response signal. For example, the resonance curve of the response signal thus deviates from a resonance curve to be expected or setpoint resonance curve such that the corresponding response signal advantageously solely lies outside the first predetermined tolerance range. A warning is thereupon advantageously displayed to a user of the method or methods and he himself can decide whether the entire production process has to be terminated or, for example, parameters of the production merely have to be corrected and/or adapted.

The mentioned warning can be suitable in particular since the finishing of a component 1 which is unusable with respect to its microstructure, for example, unnecessarily consumes machine runtime and material.

The response signal of the layer 2 can be compared, for example, to the corresponding mechanical response signal of the layer 2', which is arranged directly below the layer 2, for a possible display of the warning and/or the termination of the production of the component. Alternatively or additionally, the response signal of the layer 2 can be compared, for example, to a computed or simulated value or measured value for the response signal for the display of the warning and/or the termination of the production of the component. The mentioned value can originate from a computer-assisted design of the component and/or a finite element analysis.

Figure 3:
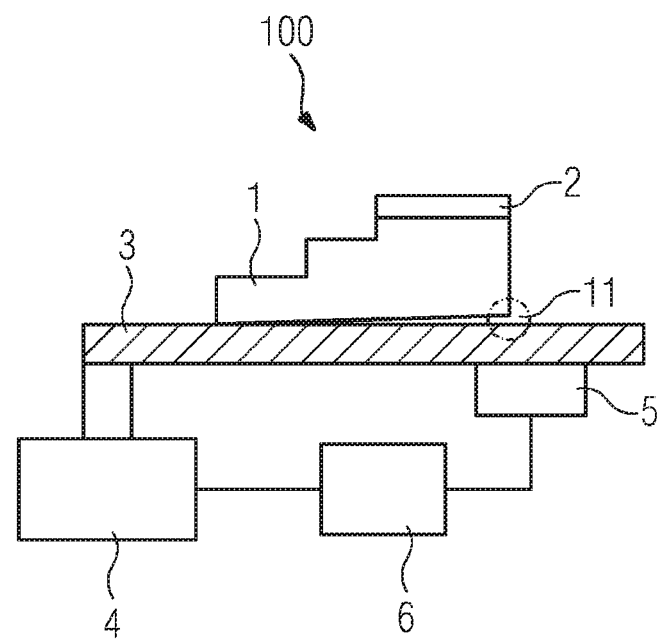
FIG. 3 schematically indicates at least a part of a method for testing the component according to a further embodiment.

FIG. 3 shows a schematic sectional or side view of the device 100. FIG. 3 shows, like FIG. 2, a partially produced component 1 on the component substrate 3. It is indicated, for example, that a detachment of the component 1 from the component substrate 3 occurs during the production of the layer 2 or at another point in time of the additive production of the component 1 (cf. dashed circle 11). Such a detachment can result in damage to the device 100, for example, due to a collision with the coater unit (cf. reference sign 7 in FIG. 1).

The detachment advantageously results—in comparison to a structural flaw in only one individual layer of the component 1 (cf. reference sign 10 in FIG. 2)—in a greater deviation of the response signal from a response signal to be expected, which is measured in the case of a suitably constructed component, which is substantially free of structural flaws, by the measuring unit 5. The reason for the increased deviation of the response signal in comparison to a structural flaw from the response signal to be expected and beyond the second predetermined tolerance range is advantageously in the greater change of the natural frequency (frequencies) or resonances of the bond of the component substrate 3 and component 1 due to the detachment.

Accordingly, a response signal is advantageously measured for the component 1 in FIG. 3, which lies outside both the first and also the second predetermined tolerance range. The production of the component 1 is therefore advantageously automatically terminated. A warning can optionally also be displayed to the user.

The monitoring unit 6 can be designed, for example, to measure or identify a response signal via a pattern recognition and then to decide accordingly whether the response signal or, for example, corresponding measured values lie inside or outside the mentioned predetermined tolerance ranges or not.

Furthermore, the mentioned tolerance ranges can advantageously be defined or dimensioned via the monitoring unit 6. Furthermore, parameters of the production of the component can be adapted to avoid flaws or damage, for example, (further) material, device, or resulting damage, by the monitoring unit 6—proceeding from the mechanical response signal. The parameters can be the beam profile of a laser or electron beam, a powder delivery rate, the size of an exposed region, an exposure speed, parameters of the laser focusing, the laser power, a flow rate of an inert gas for the production, a layer or a ply thickness of the layers of the component to be produced in succession, and/or parameters of the solidification.

The invention is not restricted thereto by the description on the basis of the exemplary embodiments, but rather comprises every novel feature and every combination of features. These include in particular every combination of features in the patent claims, even if this feature or this combination itself is not explicitly specified in the patent claims or exemplary embodiments.

The invention claimed is:

1. A method for testing a component to be additively produced, comprising:
    mechanically exciting a first additively constructed layer of the component together with a component substrate during an additive production of the component on the component substrate, wherein the component is a gas turbine engine component, and wherein a characteristic frequency spectrum of the component is used for the mechanical excitation, and wherein the characteristic frequency spectrum is a resonance curve of the component,
    measuring a mechanical response signal of the first additively constructed layer of the component,
    comparing the mechanical response signal of the first additively constructed layer to a simulated or computed value of the characteristic frequency spectrum;
    displaying a warning when the difference between the mechanical response signal and the simulated or the computed value lies in a first comparison warning range outside a predetermined tolerance range;
    carrying out a termination of the additive production of the component when a difference between the mechanical response signal and the simulated or the computed value lies outside the predetermined tolerance range and outside the first comparison warning range, measuring a mechanical response signal of a second additively constructed layer of the component, the second additively constructed layer constructed at a point earlier in time than the first additively constructed layer;
    comparing the mechanical response signal of the first additively constructed layer to the mechanical response signal of the second additively constructed layer of the component;
    displaying the warning when the difference between the mechanical response signal of the first additively constructed layer and the mechanical response signal of the second additively constructed layer of the component lies in a first comparison warning range outside the predetermined tolerance range; and
    carrying out the termination of the additive production of the component when a difference between the mechanical response signal of the first additively constructed layer and the mechanical response signal of the second additively constructed layer lies outside the predetermined tolerance range and outside the first comparison warning range,
    wherein the component comprises a superalloy.

2. The method as claimed in claim 1, wherein the mechanical excitation is carried out by means of sound, vibrations, oscillations, and/or piezoelectrically.

3. The method as claimed in claim 1, wherein the mechanical excitation and the measurement are parts of an acoustic resonance or oscillation analysis, a sound emission analysis, an ultrasonic test, or a vibration test.

4. The method as claimed in claim 1, wherein a structural flaw in the first additively constructed layer or a detachment of the component from the component substrate produces a difference between the mechanical response signal of the first additively constructed layer and the simulated or the computed value that lies outside the predetermined tolerance range.

5. The method as claimed in claim 1, wherein the gas turbine engine component comprises a hot gas path component.

6. The method as claimed in claim 1, wherein the super alloy comprises a nickel-based super alloy or a cobalt-based super alloy.

7. An additive production method comprising:
    testing a component to be additively produced as claimed in claim 1, and additively producing of at least one further layer for the component if the difference between the mechanical response signal of the first additively constructed layer and the simulated or the computed value lies within the predetermined tolerance range.

8. The additive production method as claimed in claim 7, further comprising:
    a solidification step, wherein the mechanical excitation is carried out during solidification of individual additively constructed layers of the component.

9. The additive production method as claimed in claim 7, wherein the additive production comprises: selective laser melting, selective laser sintering, or electron beam melting.

* * * * *